July 21, 1970  E. HALAS  3,521,091

SUPERCONDUCTING APPARATUS

Filed Oct. 1, 1965  6 Sheets-Sheet 1

INVENTOR
EDWARD HALAS

BY *Mason, Mason & Albright*
ATTORNEYS

INVENTOR
EDWARD HALAS

INVENTOR
EDWARD HALAS

ATTORNEYS

July 21, 1970   E. HALAS   3,521,091

SUPERCONDUCTING APPARATUS

Filed Oct. 1, 1965   6 Sheets-Sheet 4

INVENTOR
EDWARD HALAS

BY *Mason, Mason & Albright*
ATTORNEYS

INVENTOR
EDWARD HALAS

July 21, 1970     E. HALAS     3,521,091
SUPERCONDUCTING APPARATUS

Filed Oct. 1, 1965     6 Sheets-Sheet 6

INVENTOR
EDWARD HALAS

BY Mason, Mason & Albright
ATTORNEYS

United States Patent Office 3,521,091
Patented July 21, 1970

3,521,091
SUPERCONDUCTING APPARATUS
Edward Halas, 125 Saxon St., Woodbridge, Va. 22191
Filed Oct. 1, 1965, Ser. No. 492,110
Int. Cl. H02k
U.S. Cl. 310—10                22 Claims

ABSTRACT OF THE DISCLOSURE

A rotating electric power machine with an isolated superconducting field coil constructed of foil strips which are damped by placing two strips in a side-by-side relationship and connecting the end of one strip to the beginning of the other, or by coating the strips with a further conductor such as copper. The armature structure is maintained at a cryogenic temperature above its superconductive transition temperature and is also of foil strip construction to improve cooling and resist centrifugal crushing and cut-through. The damping structure maintains direct current superconducting fields in the superconducting state against reacting fields from the adjacent alternating current windings.

BACKGROUND AND OBJECTS OF THE INVENTION

This invention relates to superconducting apparatus such as motors and generators used for the production of mechanical or electrical power. It also relates to types of coil windings and damping techniques for controlling the capacitance in such windings.

It is known that conventional generators and motors utilizing normal temperature electrical conductors and magnetic flux carrying materials are in a high state of development and are in everyday application.

For many years it has been the dream of inventors to bring about improvements in electrical apparatus through the use of superconducting coils and superconducting current magnetic fields. However, there have been numerous obstacles which have deterred the development of superconducting apparatus for useful application, and the quest for workable superconducting apparatus has been a source of great discouragement and frustration for electrical manufacturers.

More than fifty years have elapsed since the first reference was made to the utilization of superconducting coils in electrical apparatus and in that period of time there have been many failures. It was reported in 1915 in the Scientific American magazine that the most significant scientific event of 1914 was the discovery by Professor Onnes that when certain metals are cooled to absolute zero, they cease to have any measurable electrical resistance and that a current started in a coil which is cooled to cryogenic temperatures will continue without any appreciable reduction in magnitude. It was considered unlikely at that time that the discovery would have any commercial application in the field of electrical engineering. At the same time, however, it was noted that all electrical machinery could be traced to such seemingly impractical experiments from a commercial point of view.

Many problems exist in achieving superconducting apparatus. For example: the fabrication of superconducting materials into suitable coils, the construction of the coil to withstand the high mechanical forces resulting from the circulating electrical currents, the winding of the coil to protect it from electrical transients and changing magnetic fields, the most efficient cooling of the superconducting coil to preserve the superconducting properties, etc.

A copending patent application Ser. No. 418,357, filed Dec. 14, 1964, discloses solutions to the problem of superconducting coil fabrication, protection of the coil with respect to electrical transients and changing magnetic fields.

As has been mentioned there has been a desire for many years for superconducting apparatus which would possess more utility than conventional room temperature apparatus. But, the problems involved in originating practical embodiments have been difficult of solutions since the behavior of superconducting coils are frequently not predictable. For solutions, careful attention must be given to much empirical detail.

An important object of this invention is to provide a better understanding of the underlying design principles of superconducting apparatus and to apply such principles in practical embodiments.

With modern technology, the most useful electrical apparatus is that which develops or makes use of an alternating frequency current. The condition of being able to handle alternating frequency currents, however, imposes a heavy burden on superconducting devices because superconductors are inherently direct-current devices. Alternating currents of even very low frequencies affect superconducting coils adversely. It, therefore, becomes necessary to incorporate damping circuits into the superconducting coils, by increasing the distributed capacitance through winding techniques as described in my copending patent application Ser. No. 418,357, involving thin film superconducting coils. Essentially, this comprises the employment of winding two strips together and electrically connecting the end of one strip to the beginning of the other to give a continuous circuit. There are other ways of introducing distributed capacitance effects, but only those methods are preferred which will keep the dimensions of the coil to a minimum size in volume and produce highest efficiency.

An important advantage of the present invention lies in the techniques taught herein to preserve the continuity of the field flux despite the demagnetizing flux effects produced by the relatively moving armature.

There are further problems in that although it may be desirable that the alternating current apparatus be completely superconducting, this is considered impractical in the present state of the art. The alternating current armature is not adaptable to the use of superconductors although certain advantages of efficiency and higher power densities would otherwise be obtainable. from the use of superconductors in the magnetic field. The reason for this is that superconductors possess zero resistance and permit high current densities if the current is a direct current. However, with an alternating current, the superconductors develop resistivity which is a function of frequency. Also, heating effects resulting from the $I^2R$ loss thus produced impairs the properties of superconductors.

Superconductors passing through a magnetic field generate within themselves a large current and a very low voltage. In conventional generators, a voltage is generated across the armature windings. Power at such voltages is transmitted over long distances through the use of voltage changing transformers. This is the major advantage of alternating current over direct current. While a complete superconducting generator with both field and armature windings in a superconduction state is possible to achieve, it presents a serious problem in that the power generated is of exceedingly low voltage and very high amperage. This in turn creates difficult transformer problems for power transmission. It is thus a capability of this invention to produce electrical power with sufficiently high voltage differentials adequate for conventional power transmission.

Difficult problems exist also relative to cooling the rotating superconducting apparatus. In this connection, it is to understood that it is possible to rotate either a superconducting field or superconducting armature. But, in either event, it is difficult to cool the rotating superconducting member. The reason is that the superconductors must be immersed in fluid helium at cryogenic temperatures to possess superconducting properties. Liquid helium, however, has a tendency to vaporize easily in the influence of rotating bodies. It thus becomes significantly more difficult to cool the rotating body efficiently or adequately. For such reasons the preferred superconducting member of my invention is one which uses a superconducting magnetic field that is stationary and a rotating alternating current armature which uses conductors not superconducting. It is a further object of this invention to provide a superior superconducting magnetic field design for combination with an armature which is not necessarily super conducting.

A problem also exists because of the centrifugal forces stressing the conductors on the rotating member. Where conventional wire conductors are used, the problem of electrical insulation cut-through occurs with centrifugal forces pressing on small contact areas to crush the insulation so that a short circuit result. By using foil strip conductors it is possible to provide large load bearing areas so that cut-through is greatly minimized. In addition, by using aluminum foil conductors which have a low weight per current carrying capacity, the stress problems are further reduced. Accordingly, a still further advantage of the invention lies in the use of foil strips in the superconducting apparatus.

The armature conductors must be effectively cooled to reduce $I^2R$ losses. It is well known that conventional conductors have non-uniform heat distribution with hot spots developing in the windings. By using foil conductors, in accordance with the invention improved heat transfer characteristics, in addition to the other advantages, are achieved.

It is possible to obtain strong magnetic fields more efficiently with superconductors than it is with normal conductors. This results in a more efficient process for generating electric power than was previously possible, since the power generated is proportional to the square of the flux density expressed in mathematical terms.

Since it is possible to obtain strong field efficiently by the ue of superconductors without the attendant power losses, is is not necessary to use magnetic flux materials such as iron where the flux density exceeds the saturation limits of the materials. Elimination of magnetic materials is beneficial since it reduces the weight of electrical apparatus. In addition, the wave form of the armature voltage is improved by eliminating unwanted effects due to material saturation which tend to distort voltage wave forms.

There are advantages to be gained by generating a higher frequency at a lower rotational speed. This invention includes a technique for doubling the frequency by utilizing a new construction which effectively doubles the number of poles. The results obtained through this technique are a still further object of the invention.

Other objects, adaptabilities and capabilities will appear as the description progresses, reference being had to the accompanying drawings, in which:

DESCRIPTION OF THE PREFERRED EMBODIMENTS

The electrical apparatus with a normal armature and a superconducting field is the preferred embodiment. It is, however, advantageous to cool the rotating armature by means of cryogenic fluids, other than liquid helium, which possess efficient heat vaporization properties. Examples of preferred fluids are liquid nitrogen, liquid oxygen, liquid hydrogen at reduced pressures, liquid argon, or others that possess surface tensions in the order of 0.3 to 50 dynes/cm.

Figure 1:
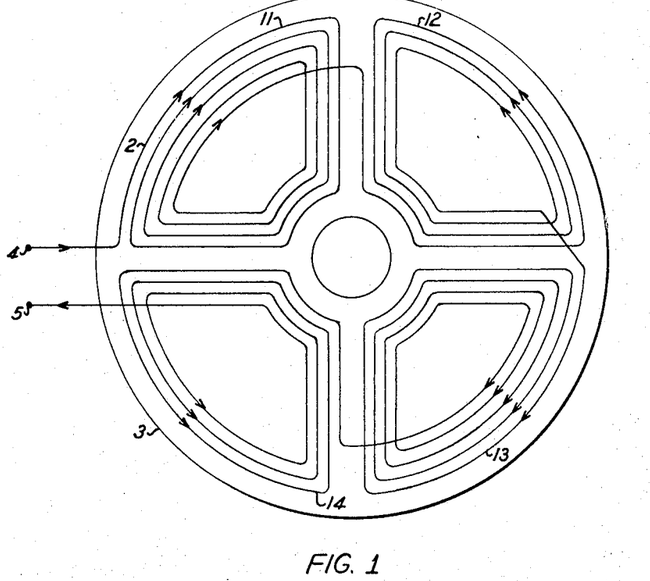
FIG. 1 is a schematic representation of an armature phase.
Figure 7:
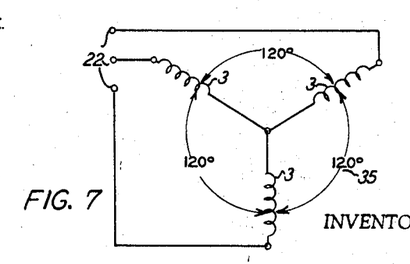
FIG. 7 is a schematic representation showing the interconnection of the three-phase windings.

FIG. 1 shows one phase of four aluminum foil coils. Each disc is comprised of such coils wound in or on a suitably strong nonconducting material such as glass fiber filled epoxy, and an input lead 4 and an output lead 5. The arrows signify the direction in which the coils are wound and also the direction of the current. It will be noted that no two coils in succession are wound in the same direction. For example, coils 11 and 13 are wound clockwise as shown in FIG. 1 and coils 12 and 14 are wound counterclockwise. Interconnection between coils is accomplished by means of any appropriate conductor such as copper wire, as will be appreciated by those skilled in the art. In this and all circuits shown herein, damping by double windings with a cross-over or other suitable means may be employed—particularly where the circuits are superconducting. Another method to obtain damping with the foil strip conductors is by copper plating same. In a three-phase generator or motor, three of these disks such as shown in FIG. 1 are placed closely side by side with common center of rotation displaced 120 electrical degrees from each other. FIG. 7 shows a Y connected armature, where each of the disks 3 constitutes armature windings. The 120° arcs designated 35 are, it is to be understood, electrical degrees and not mechanical degrees. It should be pointed out that it is not necessary to have four field coil sets to complete the generator. For, in practice, any number of field coil sets up to four may be used depending upon the requirements and convenience.

Figure 2:
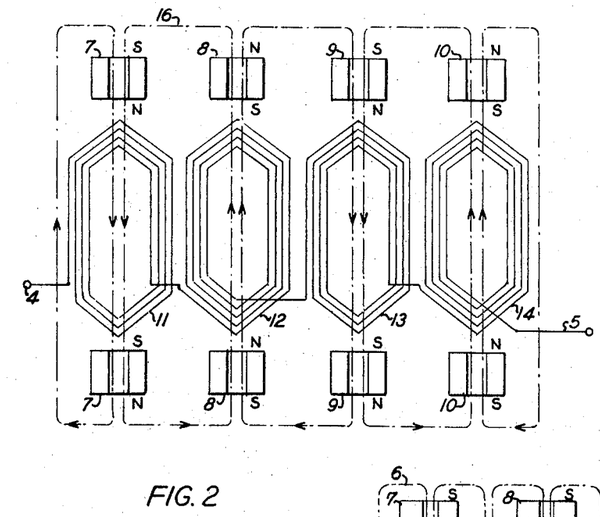
FIG. 2 is a schematic representation of one phase of the magnetic field with the armature phase of FIG. 1.

In FIG. 2, a further schematic drawing shows one phase of the armature winding of the field coil circuit. For convenience in the illustration, the armature field coils are drawn flat on the paper. Actually, however, the armature coils should be normal to the magnetic field flux which is shown also in the plane of the paper. Reference numerals 11, 12, 13 and 14 refer to the armature coils which are the same coils as are included in disk 3 shown in FIG. 1. Reference numerals 7, 8, 9 and 10 designate the field coil sets which each produce a strong magnetic field for the armature conductors. The field coil sets 7, 8, 9 and 10 are stationary and the armature coils 11, 12, 13 and 14 rotate mechanically through the magnetic fields to generate a voltage in the armature windings. It will be understood that many mechanical and circuit arrangements are possible which will result in the generating voltage in the armature windings or, in motors, in the production of mechanical power at the shaft.

Figure 3:
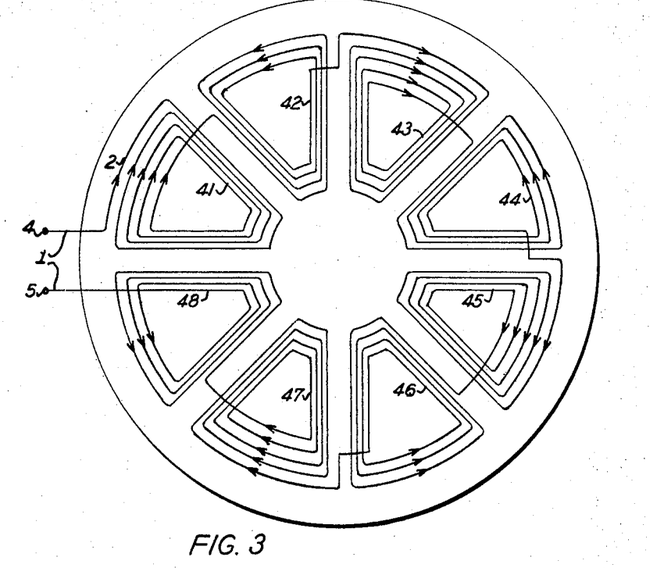
FIG. 3 is a schematic representation similar to that shown by FIG. 1 but with the frequency doubled.
Figure 4:
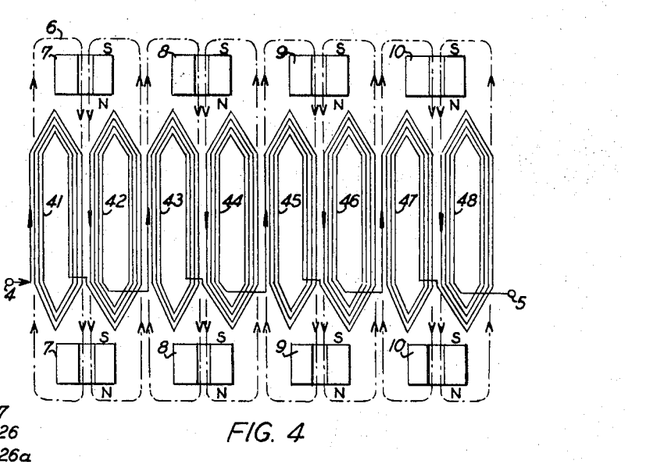
FIG. 4 is a schematic representation similar to FIG. 2 for the armature phase shown in FIG. 3.

In FIGS. 3 and 4 are shown a preferred superconducting motor or generator embodiment in which twice the frequency is utilized or generated over that arrangement of FIGS. 1 and 2 with a substantial reduction in size and weight. Reference numerals 41, 42, 43, 44, 45, 46, 47 and 48 designate the armature coils which are arranged as indicated in FIG. 3. This is, of course, a single phase of the armature winding and three windings properly spaced with reference to electrical degrees, as shown schematically in FIG. 7, will provide a three-phase output. The field coil sets which may be the same as shown in FIG. 2, are stationary and the armature coils rotate mechanically through the magnetic fields to generate a voltage in the armature windings. Again, many known mechanical and circuit arrangements are adaptable to generate a voltage in the armature windings or to provide mechanical power from a motor. The plane of the armature windings is maintained normal to the lines of flux, or very nearly so.

Figure 5:
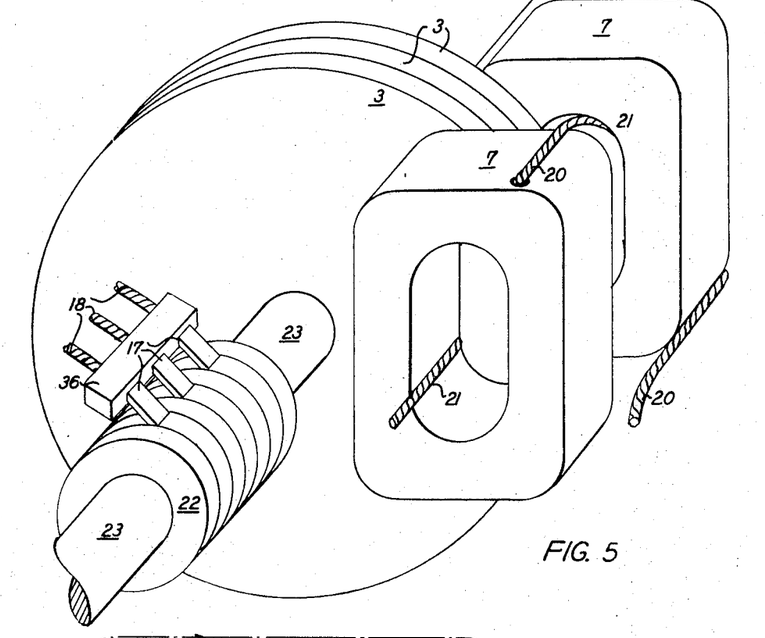
FIG. 5 is a perspective view of the apparatus in accordance with the invention showing the arrangement of one field coil, slip rings, current collectors, and electrical output leads.

FIG. 5 shows a perspective view of the more general embodiments of the superconducting generator. Reference numeral 18 designates three-phase alternating current output leads. Reference numeral 17 designates the current collectors, which are carried by a current collector holder 36. A slip ring assembly 22 is fixed on a shaft 23. Reference numeral 7 designates one of the superconducting coils with 20 and 21 being interconnections between superconducting coils. In fact, four such coils are distributed around the shaft 23. The armature coils assembly is made up of three disks 3, secured to the shaft 23.

Figure 6:
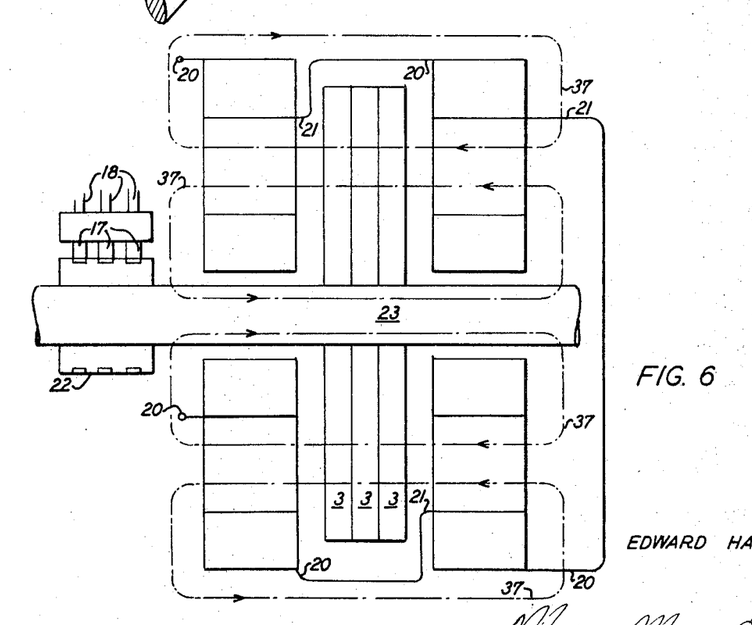
FIG. 6 is a diagrammatic sectional view of the apparatus shown in FIG. 5 illustrating the direction of magnetic flux.

FIG. 6 is a digrammatic cross-section of the superconducting generator. The dotted lines indicate lines of flux 37 which must be mechanically cut by the armature coils to generate a voltage.

As previously noted, FIG. 7 is a schematic drawing in which reference numeral 3 refers to the armature coils in each disk arrangment. The particular arrangement shown is a three-phase Y connected winding. However, as will be understood by those skilled in the art, many different types of windings connections are possible.

Figure 8:
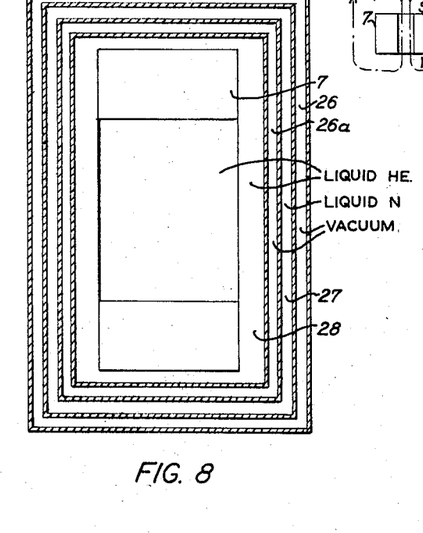
FIG. 8 is a diagrammatic illustration of a thermal enclosure to maintain the coils below the superconducting transient temperatures.

In FIG. 8 is shown a dewar thermal enclosure for a superconducting coil in accordance with the invention. First, within the enclosure is a vacuum space 26. Next, within the enclosure is a liquid nitrogen 27 shield which has inboard thereof a further vacuum space 26a surrounding liquid helium contained in the central space 28. The thermal enclosure shown is a practical and preferred embodiment, but other types of thermal insulation may be utilized such as multiple layer insulation which have alternating layers of reflecting materials, for example aluminum foil with a separating medium such as glass cloth, or such as crumpled mylar with aluminum deposition spirally wound in a vacuum enclosure.

Figure 9:
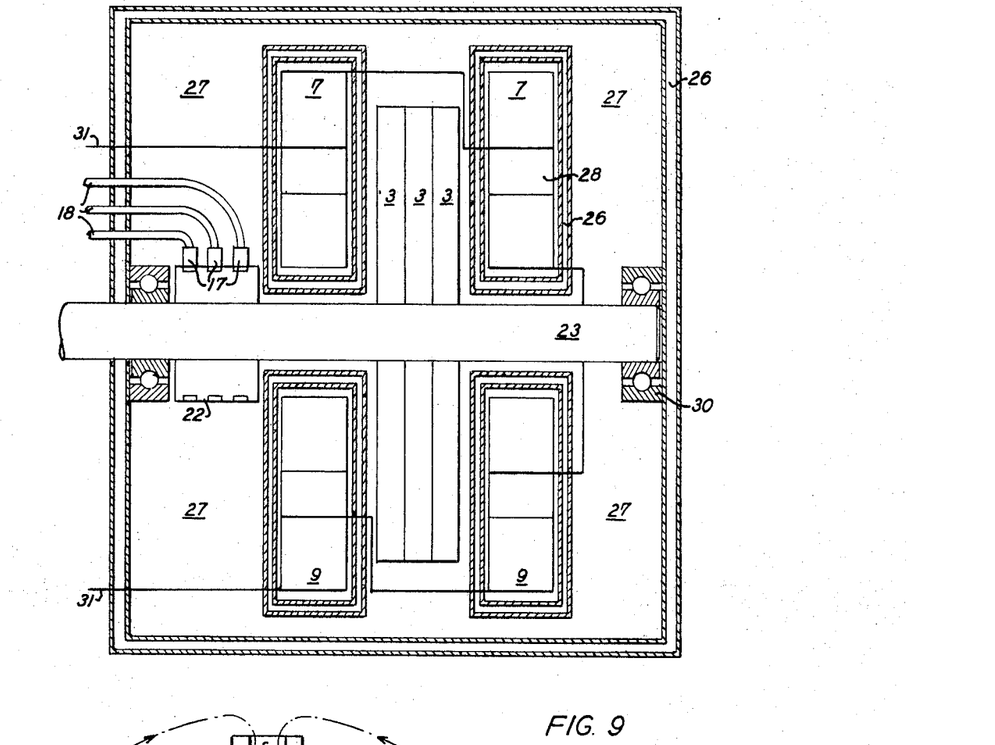
FIG. 9 is a diagrammatic sectional view of a superconducting generator where the rotor is also cooled by cryogenic fluids.

An embodiment of a superconducting generator in which the armature windings are cooled in a cryogenic liquid such as nitrogen 27 is shown in FIG. 9. In this embodiment, a larger power capacity is obtainable from the rotor armature where it is cooled with cryogenic liquid as shown.

If the liquid nitrogen 27, as shown in FIG. 9, be replaced by liquid hydrogen under a vacuum, the transition temperature surrounding the rotoring armature is dropped below the critical temperature of niobium-tin or certain other supeconductor materials whereby the armature is rendered superconducting. More specifically, since the critical temperature of niobium-tin is 18 degrees Kelvin, by placing liquid hydrogen under a vacuum it is possible to lower the temperature of liquid hydrogen to about 14 degrees Kelvin and render niobium-tin coils superconducting. It will, however, be appreciated that by regulation of the vacuum, the liquid hydrogen should be maintained above its freezing point. Thus, it may be understood that by employing by various techniques, such as regulating the pressure of a cryogenic liquid, it is possible to maintain it at an appropriately useful temperature for superconducting elements.

Figure 10:
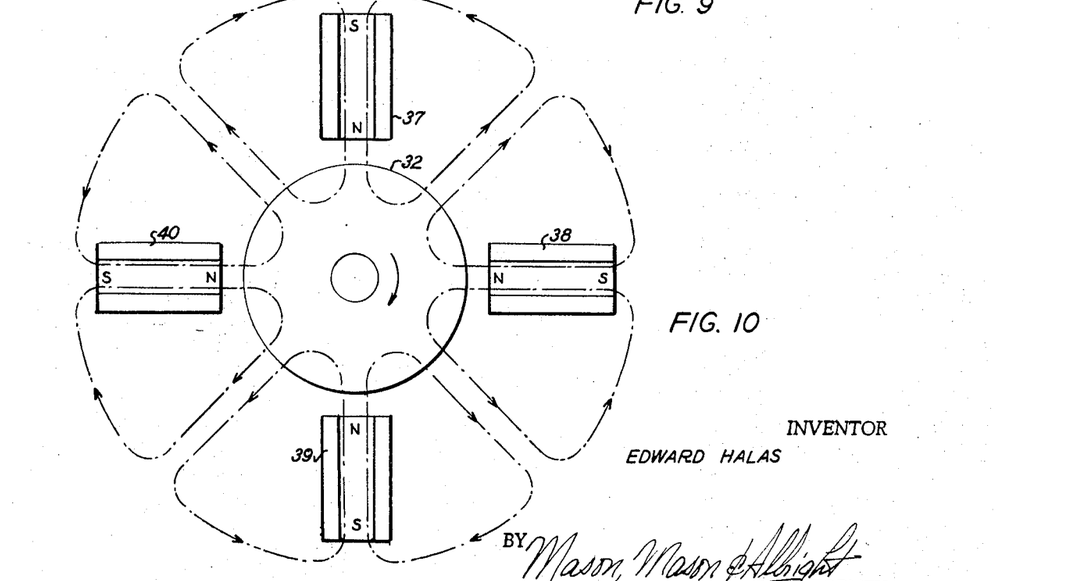
FIG. 10 is a diagrammatic sectional view of apparatus in accordance with the invention wherein a cylindrical rotor is employed between the windings.
Figures 11, 12, 13, 14, 15, 16, 17:
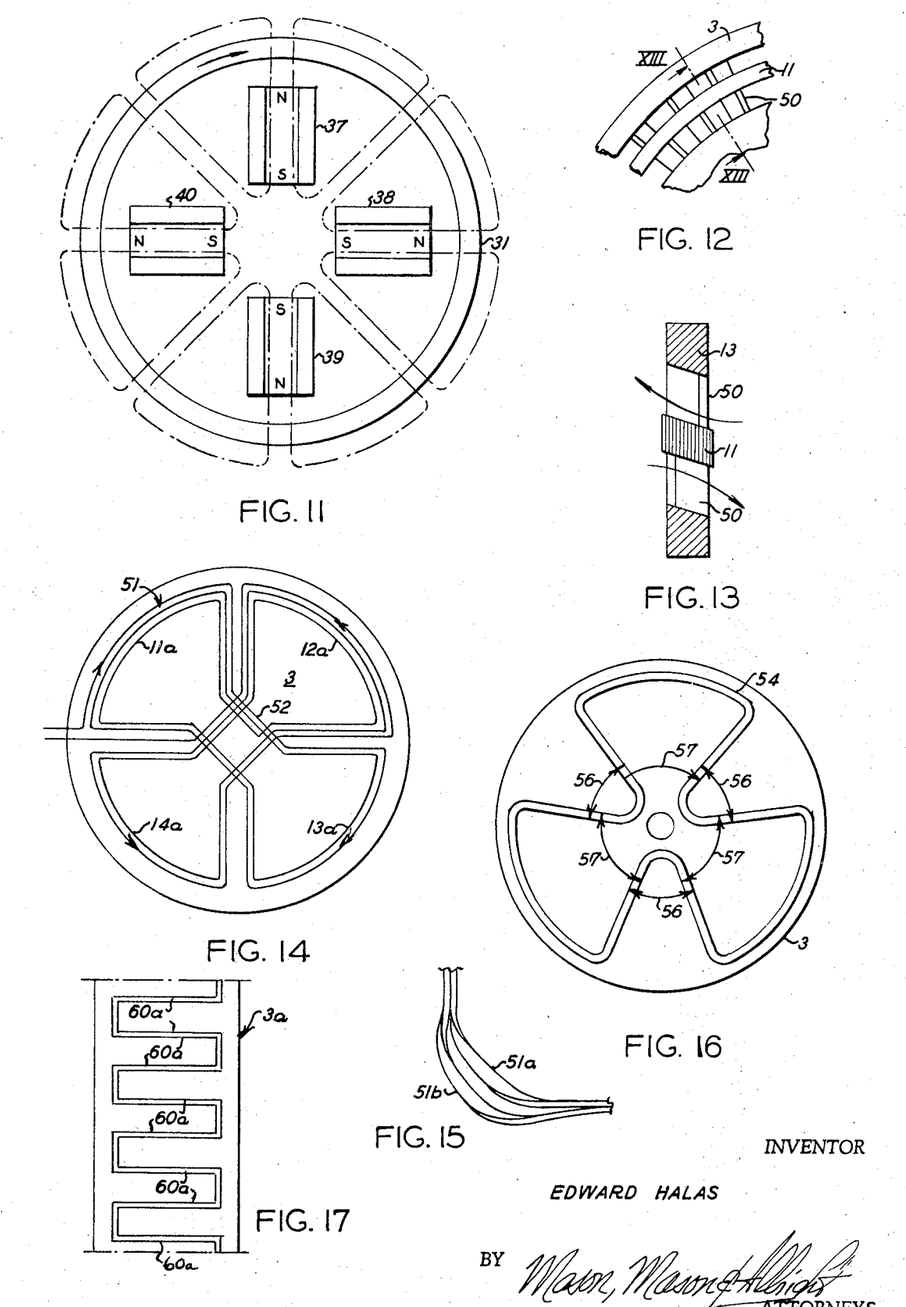
FIG. 11 is a view of an apparatus similar to FIG. 10, but with the cylindrical rotor on the outside of the field windings.
FIG. 12 is a fragmentary view of the armature windings on a disc with the windings disposed between cooling vanes.
FIG. 13 is a fragmentary sectional view taken on lines XIII—XIII of FIG. 12.
FIG. 14 is a representation similar to FIG. 1 showing an alternative method of winding an armature phase.
FIG. 15 is a fragmentary detail showing a method of crossing the foil strips of the windings shown in FIG. 14.
FIG. 16 is a schematic representation of a further embodiment of an armature phase.
FIG. 17 is a schematic representation of a still further embodiment of an armature phase as may be applied to a cylinder.

The theory of a complete superconducting generator, where both the field and armature windings are superconducting, is that the armature coils will generate a higher current at a lower voltage. This is advantageous for certain applications, such as in the chemical field where high current with relatively low voltage may be utilized. Other mechanical arrangements to achieve useful superconducting generators and motors are shown in FIGS. 10 and 11. These figures are schematic diagrams of armature and field coil arrangements. The superconducting field windings 37, 38, 39 and 40 are stationary in both cases. The armature conductor cylinders 3a and 3b rotate through the magnet fields produced by superconducting field windings 37, 38 39 and 40. In the arrangement shown in FIG. 11, the fields are much easier to insulate thermally from the rotating armature. The superconducting coils are arranged and connected so that the four superconducting coils produce an eight pole generator which can be rotated at one-half the rotational speed of the four pole generator to obtain the same power. This arrangement produces power more efficiently than if the superconducting coils were arranged in a different polarity, for example, if the polarities of coils 38 and 40 were reversed. It is to be appreciated that in FIGS. 10 and 11, the armature coils are arranged about the perimeter of a cylinder instead of a disk as described with reference to FIGS. 1, 2, 3 and 4. With such arrangement, it is possible to provide both interior and exteriorly arranged cylinders.

As previously indicated, it is preferred that the windings in this case be composed of foil as contrasted with wire.

Strips of such foil can be very thin—usually several thousandths of an inch—and insulation, such as one-fourth mil kraft paper, is generally sufficient. An advantage of foil strips is that each turn has lateral radiated edges which are exposed to the cooling medium and thus effective heat dissipation is provided. Temperatures between adjacent layers are maintained uniform with hot spots, inherent in conventional windings, being eliminated. It is preferred that the windings in disk 3 be aluminum alloys of types known in the art, which have been developed for use as material for strip windings. Since aluminum is a superconductor at sufficiently reduced temperatures, such windings may also be used in the superconducting fields coils. However, in the present state of the art, intermetallic niobium-tin ($Nb_3Sn$) is preferred for the field coils. The foils may be disposed normal to the plane of a disk 3 or parallel to same. An example of structure which may be utilized effectively where the foil strips have their planes parallel to the plane of the disk 15 as shown in FIG. 12. Thus, we may see that the coil 11, for example, is supported by a plurality of vanes 50. The vanes 50 act to circulate air around the edges of the strip foils making up the coil 11. The edges of each of the foils is thus cooled to achieve uniform cooling of the entire coil 11. It will be appreciated, of course, that that same construction may be used if the foil coils had their planes normal to the plane of the disk 3.

FIG. 13 shows a cross-section taken on section lines XIII—XIII of FIG. 12. It will be noted in FIG. 13 that the foil coil 11 has a parallelogram cross-section with unequal angles in the corner. Such construction increases the exposure of the individual foil strips at their edges and thus tends to promote even better cooling. It will also be noted that the air path through the outer of vanes 50 is opposite to that produced in the inner row so that lateral forces due to the propeller effect of the vanes is balanced.

An alternate method of winding disk 3 similar to that shown in FIG. 1 is illustrated in FIG. 14. The windings designated 51 comprise foil strips which are normal to the plane of the disk 3. However, as is shown in FIG. 15, where such strips cross, they are given a half-twist whereby they may cross within the thickness of disk 3 which will generally be the same as the width as that of the foil strips 51. Referring to FIG. 15, it will be noted that the strips 51 may be divided in two or more bunches, such as 51a and 51b, in order to facilitate the crossing of strips in the event that the combined thickness of the strips does not permit the strips to pass each other conveniently in a single bunch. It will be noted that the coils 11a and 13a in FIG. 14 are formed in one pattern which appears to be more or less dumbbell in shape as seen in plan view and that the strips 12a and 14a are similarly disposed. The winding is the equivalent of four coils as shown in FIG. 1. It will be appreciated by those skilled in the art that eight or any number of coils, which is a multiple of four, may be similarly provided using essentially the same pattern.

FIG. 16 shows a further method of winding the foil strips designated therein 54 so as to avoid crossing of strips. It will be seen in FIG. 16 that only one crossing at location 55 is necessary. Alternate north-south poles are provided about the disk depending upon the direction of current through the foil strip 54. In order to maintain the density of the magnetic flux constant in the plane of the disk, the angles designated by reference numerals 56 are somewhat smaller than the angles designated by reference numerals 57. For example, angle 56 may be 55 degrees whereas angle 57 may be 65 degrees. The exact angle and configuration of coils, such as shown in FIG. 16, are, however, a matter of design so as to provide that lateral forces on disks 3 are not unbalanced.

Figures 18, 19, 20, 21, 22, 23, 24, 25, 26:
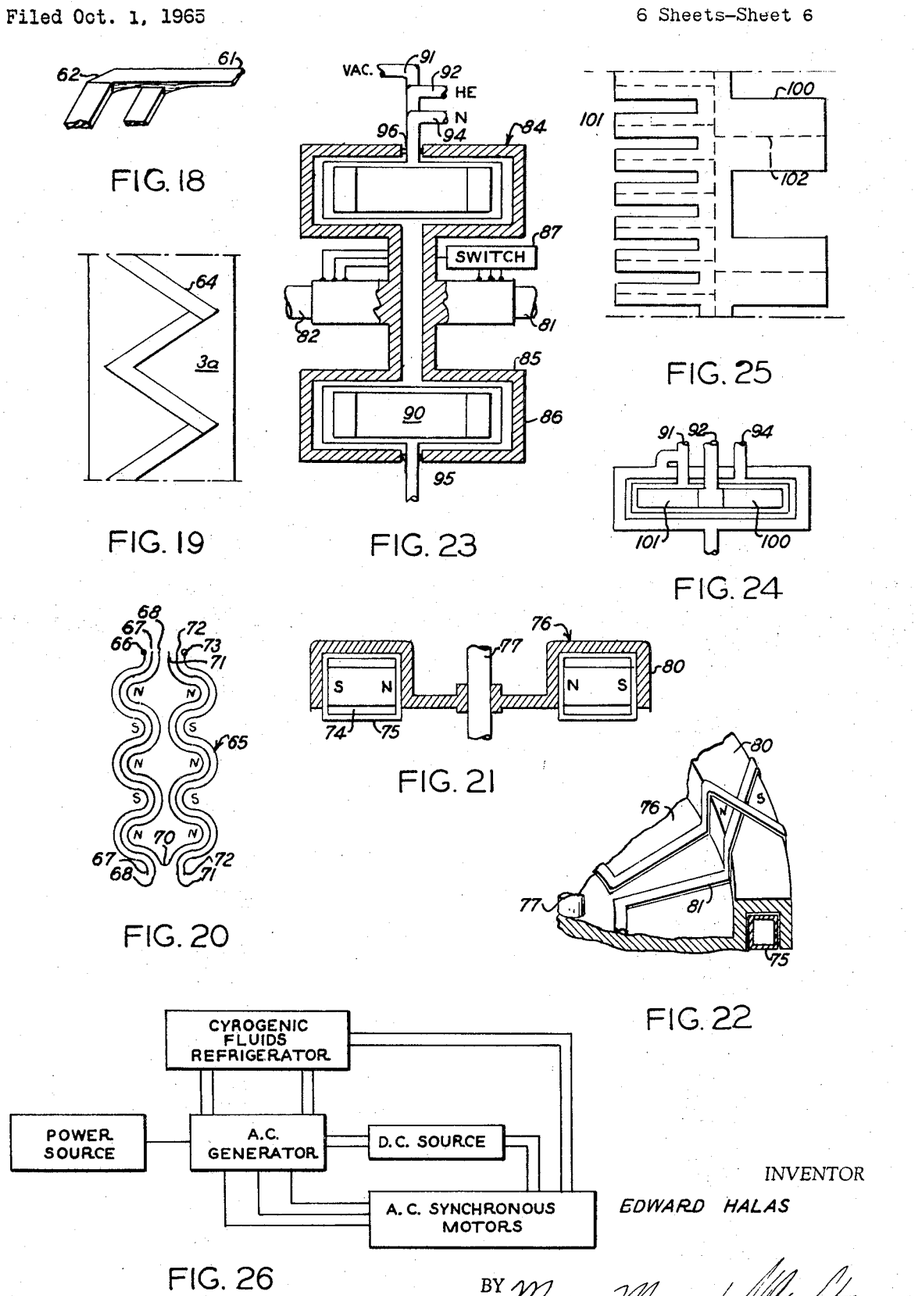
FIG. 18 is a fragmentary detail showing a method of bending the foil strips of the windings shown in FIG. 17.
FIG. 19 is a schematic representation of an alternative winding for an armature phase on a cylinder.
FIG. 20 is a schematic representation of field windings comparable to FIG. 4.
FIG. 21 is a diagrammatic sectional view of a field acting with both poles on an armature contained in a half-torus shaped portion.
FIG. 22 is a fragmentary perspective view of the apparatus shown in FIG. 21 illustrating the configuration of the armature strips.
FIG. 23 is a diagrammatic sectional view of a power conversion unit in accordance with the invention.
FIG. 24 is a diagrammatic sectional view showing a method of maintaining the field coils of FIG. 23 at superconducting temperatures.
FIG. 25 is a schematic representation of a phase of the armature coils of the unit shown in FIG. 23.
FIG. 26 is a schematic representation of a power plant system utilizing the apparatus of the invention.

FIG. 17 shows armature windings which may be employed with a cylindrical armature, such as armature 3a or 3b. Here the foil strips 60 are set out in a scalloped form. Such windings are endless and no crossings are required. With alternating current, north and south magnetic lines of flux are created about each foil strip portion 60a. Windings, such as shown in FIG. 17, would normally be with the foil strips radially disposed so that their planes are normal to the surface of the cylinder 3a. However, if desired, the same can be disposed parallel to the surface of the cylinder 3a in which case 90 degree turns can be effected as shown in FIG. 18 before strip 61. Since the thickness of each individual foil strip is doubled at the corners 62, it may be desirable to have the corners at two or more locations as indicated in the figure. However, since a thicker flange portion of the rim may not be considered undesirable, it may be advantageous to locate all of the corners 62 near the edge, which will be a thicker flanged portion of the cylinder 3a. To minimize the corners, such as corners 62 where the strip is carried parallel to the surface of the cylinder 3a, a construction such as shown in the fragmentary view in FIG. 19 may be employed wherein the foil strip 64 is zig-zagged across the cylinder 3a.

For a field coil winding, FIG. 20 shows a winding for coils comparable to those shown in FIG. 4 wherein the adjacent coils have adjacent north and south pole dispositions. It will be noted that the foil strips designated generally 65 are undulated so as to provide alternate north and south poles. With such a pattern disposed about a cylinder, as shown in FIGS. 10 and 11, it will be appreciated that the foil strips 65 may be endless without the necessity to cross itself. Thus, the current may enter at 66 and continue through the coil strip 65 to point 67 where it enters the second tier of foil strips and continues to point 68 where it enters the third tier of strips. At point 70, the strip turns in the opposite direction and goes to point 71 where it enters the second tier and to point 72 where it enters the third or outer tier from whence it is taken by the outlet connection 73. This embodiment presupposes that the strips 65 are normal to the surface of the cylinders 3a and 3b. However, the strip 65 may be placed in a parallel arrangement in which case the same arrangement is used except that the tiers are piled one on the other. With the field coils in a cryogenic environment, this latter type of winding is preferable in that the low temperature fluid can be made to flow around the coils in a manner whereby maximum heat transference between the foil strips and the cryogenic fluid is effected. For a disk, such as shown in FIG. 1, the winding of the field coils may be as shown in FIG. 14 or 16. Here again, however, with a cryogenic environment, it is preferable that the edges be exposed to the cryogenic fluid. To the extent that a proximity of the field coil windings to the armature coil windings is desirable, such can be most advantageously effected with a winding as shown in FIG. 14 with the foil strips parallel to the plane of a carrier member analogous to the disk 3. Otherwise, for mechanical reasons, it may be advantageous to dispose the foil strips normal to such carrier member.

FIG. 21 shows an electrical apparatus employing foil coils which may be either a generator or synchronous motor. The field coils 74 are disposed in a manner similar to that shown in FIG. 10 within a torus container 75. The torus container is a dewar thermal enclosure similar to that shown in FIG. 8 wherein liquid helium is surrounded by liquid nitrogen with intervening vacuum spaces. It is not shown as such in FIG. 21 for the purposes of clarity. The winding of the field coil 74 may be similar to that shown in FIG. 20. The armature windings are disposed upon a spider member 76, which is affixed to the shaft 77. It will be noted that the spider member 76 includes a half-torus shaped portion 80 which surrounds on three sides the torus container 75. The disposition of the armature windings is shown in FIG. 22 wherein the foil strip 81 is secured to the surface of the spider member 76 in such a way as to create a polarity on each side of the torus portion 80 corresponding to the polarity formed by the direct current within the field coils 74. Thus, as is well known in the art, with an alternating current applied to the armature of foil strips 81, the shaft 77 will be caused to rotate. In a similar manner, rotation of the shaft 77 will create in the armature strips 71 an alternating current.

FIG. 23 shows a power conversion unit 84 whereby power supplied to shaft 81 is transferred to shaft 82. The power conversion unit 84 has a generator part 85 and a motor part 86. Each of these units is essentially the same as the apparatus shown in FIGS. 21 and 22. Strip foil is to be used and the windings on the corresponding spider members will correspond generally to that utilized for three-phase alternating current generating and synchronous motors. The circuits are connected through through a switch 87 which gathers electrical energy from conventional current collectors or the like. The spider members for parts 85 and 86 rotate about a combined field coil space 90. The field coil space is contained within a dewar thermal enclosure such as shown in FIG. 8 and, in this embodiment, a vacuum source connection 91, a helium liquid connection 92, and a liquid nitrogen connection 94 are shown. FIG. 24 shows diagrammatically how these connections are effected. The conections have, however, been offset for the purposes of clarity. The field coils are held on a continuous disk member 95 and the outer edges of parts 85 and 86 rotate within the vicinity of such disk. Interposed between such edges and the disk is a labyrinth seal 96 whereby the interior between the generator part 85 and motor part 86 may be maintained at a substantially high vacuum.

The armature coils 100 (one phase) in the generator side of the field coil space are so disposed to give a desired frequency per revolution of the shaft 81. In contrast, the armature coils 101 (one phase) on the motor part of the unit are so spaced to give a substantially reduced rotational speed to the shaft 82. A similar coil arrangement may be used for the field coils. In such event, within the container and disposed between the coils a baffle member 102 is located to divide the flow of liquid helium into the vicinity of each of the strip foils so as to promote maximum cooling of same when the device is operated. It will be appreciated that this construction places the superconducting thermal enclosure into a minimal space which serves both for the purposes of the generator and motor. Apart from other efficiencies and advantages, this permits a considerable savings in space and weight.

FIG. 26 shows a simple schematic drawing of a practical application of the devices of this invention. Either the generator or the motor, as shown, may employ superconducting coils. The direct current source may be batteries or may be a suitable direct current generator. By recirculation of the cryogenic fluids, they may be further refrigerated and cooled by any appropriate means known in the art. For devices which are intended to run for only relatively short periods of time, the cryogenic fluids may be merely placed within the thermal enclosure and refilled from external sources as necessary.

While I have described certain preferred embodiments of my invention, it is to be understood that it is capable of other adaptations and modifications within the scope of the appended claims.

Having thus described my invention, what I claim as new and desire to secure by Letters Patent of the United States is:

1. A superconducting electrical generator or motor comprising an isolated superconductant field coil structure operating at temperatures below its superconductant transition temperature, said generator or motor having an armature coil structure operating at cryogenic temperatures above its superconductant transition temperature, means for maintaining said field coil and said armature coil at their respective operating temperatures, damping means incorporated in said field coils, said field coil being electrically damped by said damping means whereby a constant field is provided to generate a voltage.

2. The device of claim 1 wherein at least one of the coil structures has a strip configuration for rotation whereby said strip presents substantially flat surfaces to resist centrifugal crushing and cut-through.

3. Apparatus in accordance with claim 1, wherein said field coil structure is comprised of substantially flat foil strips and said foil strips are disposed parallel in close juxtaposition with intervening insulation means.

4. Apparatus in accordance with claim 3, wherein the surface of said foil strips are predominantly parallel to the axis of rotation of said armature coils.

5. Apparatus in accordance with claim 3, wherein the surfaces of said foil strips are predominantly perpendicular to the axis of rotation of said armature coils.

6. Apparatus in accordance with claim 3, wherein the edges of said foil strips are offset from adjacent foil strips whereby increased surface areas of said strips are exposed to said means for lowering the temperature of said windings to at least their superconducting transition temperatures.

7. Apparatus in accordance with claim 3, wherein said foil strips are wound substantially in interlocking dumbbell outlines as seen in plan.

8. Apparatus in accordance with claim 3, wherein said damping means comprises the coating of said foil strips with a further conductor.

9. Apparatus in accordance with claim 8, wherein said further conductor is copper.

10. Apparatus in accordance with claim 3, including cooling means for said armature coils whereby said armature coils are cooled to cryogenic temperatures above their superconducting transition temperatures.

11. Apparatus in accordance with claim 10, wherein said cooling means is liquid nitrogen.

12. Apparatus in accordance with claim 10, wherein said liquid is liquid oxygen.

13. Apparatus in accordance with claim 10, wherein said cooling means is liquid hydrogen.

14. Apparatus in accordance with claim 3, wherein said means for lowering the temperature to at least superconducting transition temperatures comprises liquid hydrogen and means for reducing the pressure of same.

15. Apparatus in accordance with claim 3, wherein said armature coil is disposed on a disk type armature.

16. Apparatus in accordance with claim 3, wherein said armature coil is disposed on a drum type armature.

17. Apparatus in accordance with claim 3, wherein said armature coil generates alternating current when revolved through magnet flux created by said field coil.

18. An electrical generator or synchronous motor comprising a field and armature coils, said field coils having their poles disposed radially and being located in a confining ring structure, said armature coils being connected to a shaft at the center of rotation of said ring structure and extending on both sides of said field coils whereby magnetic lines of flux are encountered in said armature coils from the vicinity of both the North and the South poles of said field coils, said field coils being stationary and composed of superconducting material, there being cryogenic temperature producing means surrounding said field coils for lowering their temperature to at least their superconducting transition temperature.

19. Apparatus in accordance with claim 18, wherein said coils are comprised of foil strips.

20. A superconducting electrical apparatus which comprises enclosed damped or stabilized electrical field coils and relatively moving electrical armature coils, means for introducing direct current to said field coils, said field coils being foil strips composed of superconducting material, damping or stabilizing conductor material incorporated in said field coils and means for cooling said foil strips to at least their superconducting transition temperatures.

21. A superconducting electrical generator or motor comprising an isolated superconductant field coil structure including a plurality of field coils operating at temperatures below its superconductant transition temperature, said generator or motor having an armature coil structure operating at temperatures above its superconductant transition temperature, means for maintaining said field coils and said armature coil structure at their respective operating temperatures, said field coil structure comprising foil strips composed of superconductive material disposed parallel in close juxtaposition with intervening insulation means, said field coils being electrically damped whereby a constant field is provided to generate voltage, the direction of polarity of all of said field coils being the same and field poles adjacent the poles of said field coils being unwound.

22. A superconducting electrical generator or motor comprising an isolated superconductant magnet flux producing structure including field coils operating at a temperature below its superconductant transition temperature, said generator or motor having an armature coil structure operating at temperatures above its superconductant transition temperature, means for maintaining said field coils and said armature coil structure at their respective operating temperatures, said field coil structure comprising windings of foil strips composed of superconductive material, said strips being disposed parallel in close juxtaposition with intervening insulation means, damping means included in said field coils for electrically damping same, said damping means comprising first and second foil strips in a side-by-side relationship with the end of the first of said strips being connected with the beginning of the second of said strips, said first and second foil strips each being of substantially greater length than required to provide a single pass about any one of said field coils.

References Cited

UNITED STATES PATENTS

| | | | |
|---|---|---|---|
| 1,386,524 | 8/1921 | Neuland | 310—102 |
| 3,098,189 | 7/1963 | Buchhold | 321—8 |
| 3,205,413 | 9/1965 | Anderson | 335—216 |
| 3,242,418 | 3/1966 | Mela et al. | 310—52 X |
| 3,283,276 | 11/1966 | Hritzay | 335—216 |
| 3,320,443 | 5/1967 | Klein | 310—11 |
| 3,320,454 | 5/1967 | Kober | 310—268 |
| 3,368,087 | 2/1968 | Madsen | 310—10 |
| 3,239,697 | 3/1966 | Stekly | 310—11 |

FOREIGN PATENTS

| | | |
|---|---|---|
| 894,422 | 3/1944 | France. |

OTHER REFERENCES

Papers by Stekly and by Laverick presented at the proceedings of symposium of magnet technology at Stanford University, California, Sept. 8–10, 1965; bound volume, pp. 550, 559, 560, 562, 564, 566 and 567.

DAVID X. SLINEY, Primary Examiner

U.S. Cl. X.R.

310—40, 52, 268